United States Patent Office 3,045,716
Patented July 24, 1962

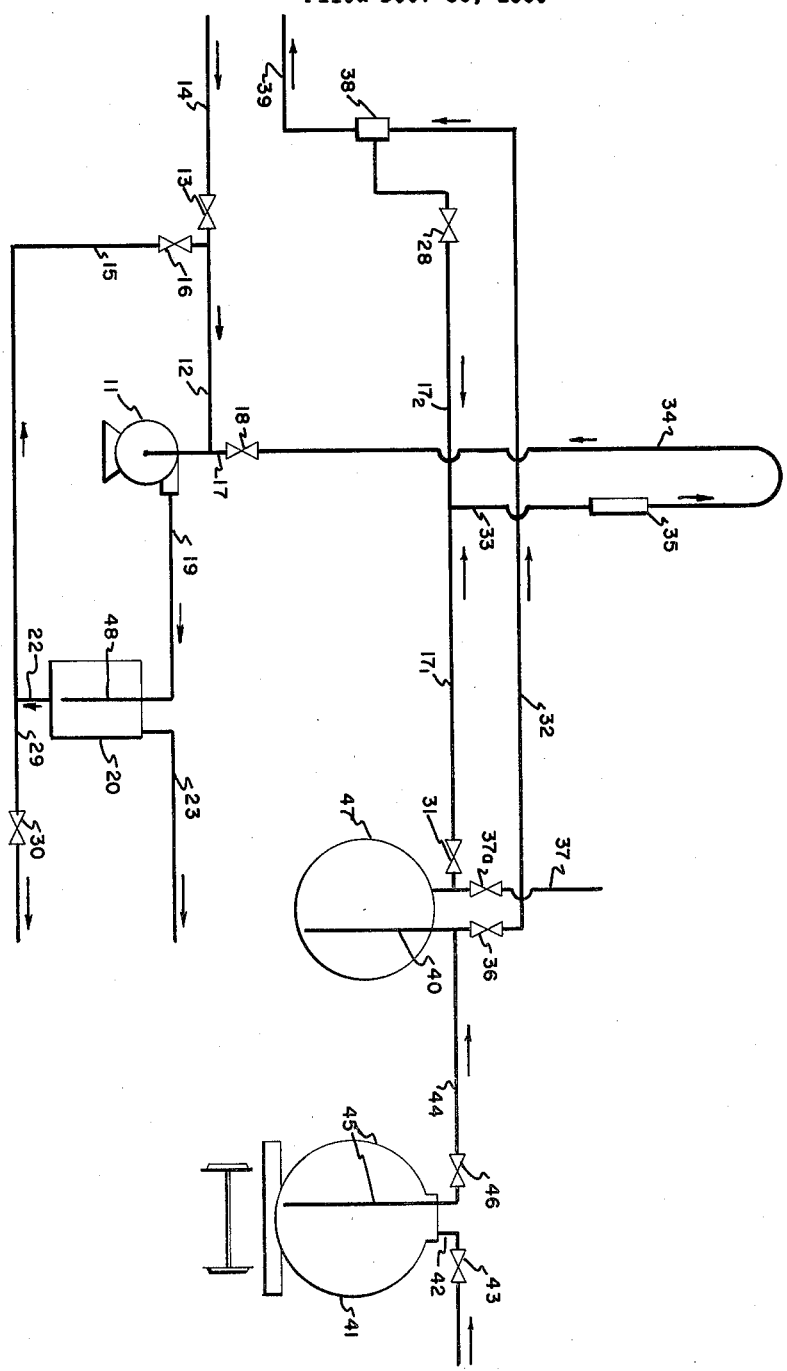

3,045,716
SIMULTANEOUS EVACUATION OF A VESSEL AND SEPARATION OF UNDESIRABLE MATERIALS FROM VAPORS
William Hewitt Morgan, Baton Rouge, La., Thomas Wesley Herbst, Jasper, Tex., and Douglas Richard King, Darien, Conn., assignors to Ethyl Corporation, New York, N.Y., a corporation of Delaware
Filed Dec. 30, 1959, Ser. No. 862,862
1 Claim. (Cl. 141—7)

This invention relates to generating and maintaining vacuum or negative or sub-atmospheric pressure. More particularly, the invention relates to providing vacuum and evacuating spaces having gases or vapors including physiologically undesirable components therein, said vacuum being employed to promote the transfer of liquids from one vessel to another vessel, or for similar purposes.

In the movement of certain industrial liquids, the employment of conventional pumping devices as movers, to cause flow by establishing positive pressure, is rigorously avoided for various reasons. In particular, in many cases the possibility of leakage occasioned by establishing substantial positive or super-atmospheric pressures in pumping or transfer line systems, creates an undesirable hazard or at least a nuisance, particularly when physiologically toxic or undesirable materials are involved. Illustrative of products of such character are, for example, organometallic compounds, or products containing appreciable quantities of organometallic components. As a typical example of a product posing the foregoing problems, antiknock liquids, containing, typically 50 percent or more by weight of tetraethyllead, are illustrative. Liquid products, of the foregoing characteristics, are transported desirably under the influence of pressure differentials established by creating a vacuum and relying on atmospheric pressure to cause movement. This requirement is particularly adhered to in plants or installations receiving shipments of such products. By maintaining or relying solely on the use of vacuum-atmospheric pressure differentials to cause movement, a number of undesirable hygenic conditions are rigorously avoided.

Because of the above environment, then, commercial products containing tetraethyllead have, for some time, been transferred from tank cars to refinery receiving or weighing tanks by vacuum means. In establishing vacuum for causing the transfer of alkyllead compositions from a tank car, or a discharging tank, to a receiving vessel or tank, the vacuum desired has heretofore been established, most frequently, by vacuum generating means of the velocity change type, i.e. customarily referred to as eductors, and also by vacuum pumps. Of these means, the eductor type devices have been more generally used. However, eductors employing gasoline as the motivating liquid have become relatively inefficient of recent years, owing to the wider usage of, and the change in characteristics of commercial gasolines in the direction of, higher volatility products. Thus, whereas the average Reid vapor pressure of commercial premium gasolines in the United States, in 1957, was 8.5 (summer) to 11.4 (winter) pounds per square inch, in previous years, the volatility was considerably lower. Thus, in 1936 the corresponding range of Reid vapor pressures was 7.1 to 9.0 pounds per square inch. Because of the increase in volatility, as expressed by the Reid vapor pressure test (ASTM Designation D323–56), the gasolines presently available for this service result in relatively inefficient performance as contrasted with performance available in preceding years. Because of the higher volatility, it is not feasible to generate, by the velocity change principle, the degree of vacuum necessary to accomplish a desired rate of liquid transfer. Accordingly, some consideration and emphasis has been given to employing mechanical pump means to establish the vacuum desired for the liquid transfer operations or for similar purposes. A complicating factor which has arisen from such expedients, however, has been the fact that the mechanical pump means, in establishing a vacuum in a receiving tank, necessarily discharge vapor or gas evacuated therefrom, and this atmosphere or vapor contains objectionable quantities of the physiologically undesirable components of the alkyllead or organometallic composition. To assure safe operating environment under such circumstances, it has then become necessary to employ scrubbing towers for the vapor evacuated by the mechanical pump means, to absorb the alkyllead components from the vapors being vented. Such an expedient is quite effective, using a heavy, absorbing liquid hydrocarbon fraction, but the use of scrubbing towers, supplemental pumps for circulating liquid and the like obviously entails a greater expenditure and investment in equipment and complicates operation. Accordingly, a significant need has existed for a reliable means of establishing adequate vacuum to accomplish rapid liquid transfer or for similar purposes, and at the same time to substantially eliminate or avoid the release of undesirable vaporized components, which release has heretofore been associated with mechanical pump means.

The object of the present invention is, generally, to provide a new and improved procedure and method for establishing a vacuum by exhausting, from a vessel or similar enclosed process space, vapors having perceptible quantities of undesirable organometallic components or the like, but to prevent release of such components to the atmosphere and thus avoid any venting problem occasioned by establishing the vacuum. A further object of a particular embodiment of the invention is to establish a vacuum in a receiving tank, by exhausting vapors of the desired character therefrom using the present invention, and to utilize said vacuum in transferring organometallic rich liquids from a discharging tank to said receiving tank. An additional object is to provide procedure and apparatus for the services or operations described, said apparatus involving a minimum of investment, operating difficulty and procedural complexity. An additional object of certain highly effective embodiments of the present invention is to provide a method, generally as described above, wherein a vacuum is generated of increasing magnitude which is correlated with the needs of a particular transfer operation, and, in addition, an automatic temperature lowering effect is provided which facilitates the removal of physiologically undesirable components from the evacuated vapors. Other objects will appear hereinafter.

The present invention, in its broadest form includes the step of generating a vacuum by a liquid sealed pump means, providing therein as a circulating sealant liquid a hydrocarbon liquid fraction. The vacuum generated is applied to, and evacuates in part, a process space such as a tank, of vapors which include physiologically undesirable components. Typically, vapors are exhausted from a receiving tank which is connected to a discharging tank, the vacuum being established in the receiving tank causing movement from the discharging tank to the receiving tank. The mechanical pumping means employed is characterized in that it is of the wet or liquid piston types, and subjects the sealant hydrocarbon liquid to the negative pressure or vacuum which it develops. It is found that not only is a vacuum generated in an extremely effective manner, but, in addition, the physiologically undesirable components, of the vapor removed, are efficiently and almost completely absorbed, in the hydrocarbon liquid. The evacuated vapors, as a result of this highly beneficial purifying effect, can be discharged directly to the atmosphere through the normally available vent lines or stacks of a plant environment.

In particularly preferred forms of the invention the hydrocarbon liquid employed is itself a high volatility gasoline. Surprisingly, it is found that, when using such preferred sealant liquids, not only is a vacuum efficiently generated, but, in addition, the vacuum is generated in a degree over and above that which is predictable and, further, the vacuum operation is accompanied by a cooling effect plus a highly efficient removal of undesirable components from the vapor being processed.

In one highly effective form of the invention, the sealant liquid is provided as a batch, initially of high volatility gasoline. Such a batch of sealant liquid is employed from a number of cycles. By this is meant that the batch of sealant liquid can be circulated in toto, for up to 10 or 20 times, or longer. In preferred embodiments of the invention, this use of a recirculating batch of sealant hydrocarbon liquid, of normally high volatility, provides a plurality of unexpected, highly advantageous benefits. It is found, in such embodiments, that, not only is the maximum attainable vacuum increased, but, in addition, the sealant liquid temperature is lowered. The special benefits of those effects are that the vacuum inducing capacity can be increased as the demand increases, and in addition, the effectiveness of the sealant hydrocarbon as an absorbent liquid is increased. The change in capability of the system, as outlined above, is believed to be caused by an actual flashing of the more volatile components of the hydrocarbon during the operation.

Another form of the invention involves a continuous throughput of a sealant liquid. In such instances, a similar, but less marked, effect with respect to the vacuum capacity of the system is observed, but not to the same degree as in the recirculating batch embodiments.

The details of the operation, and a description of the best mode of its performance, and working examples of the invention are given hereinafter and will be most readily understood in connection with the accompanying FIGURE, the figure being a schematic mechanical illustration of an installation of apparatus for carrying out an embodiment of the process.

Referring to the figure, the apparatus employed in carrying out the invention includes a wet-type pump means 11, a knock-out or separatory drum 20 being provided to segregate liquid and vapor phases discharged from said pump. As previously mentioned the present process is most commonly employed in establishing vacuum to transfer a liquid from a discharging vessel to a receiving vessel. However, the vacuum engendered can also be utilized in other operations, for example, while transferring a liquid from a vessel to various processing operations. The present figure shows piping and supplemental equipment to permit use of the generated vacuum for these several purposes. A discharging vessel 41 is, in this instance, a tank of a conventional railroad tank car and the receiving vessel or drum is a permanently positioned vessel 47. A main vacuum line 17 from the pump means 11 is fitted with a shut-off valve 18. Forming part of, or connected to the main vacuum line 17 is a barometric loop line including a downstream branch 34, and an upstream branch 33. The latter branch has an enlarged segment 35. The barometric loop is provided to assure that no liquid is induced into the pump 11, the dimensions of the barometric loop being apportioned in accordance with the properties, i.e. density of the liquid being processed.

At the upstream end of the barometric loop, it branches, in this installation to two lines $17_1$ and $17_2$. These branch lines permit the application of the vacuum generated to different process spaces.

One branch line $17_1$, having a shut-off valve therein, connects to the receiving tank 47. A transfer line 44 connects the receiving tank 47 to a dip line 45 which reaches to the lowermost interior point of the discharging vessel 41, the transfer line 44 being provided with a shut-off valve 46. A gas fill line 42, with a closure valve 43 is provided to the discharging vessel 41 to admit air, during its emptying and transfer of any liquid content thereof to the receiving vessel 47. A branch line 37, having a valve $37_a$ is also provided connecting to the vacuum line $17_1$ to the receiving tank 47. This permits breaking a vacuum established on the receiving tank 47 and admitting air.

A supply line 14, with a control valve 13 therein, is provided to feed a sealant hydrocarbon liquid from a storage supply, not shown, through a sealant intake line 12 to the pump means 11. The pump 11 establishes a vacuum in the vacuum line 17, and discharges, through a discharge line 19 gas and sealant liquid, this two phase mixture being passed through a dip leg 48 to the separatory drum 20. The separatory drum also serves as a holdup vessel for sealant hydrocarbon. Vapor and gas are separated in the separatory drum 20 from the liquid phase, the vapor being discharged through an overhead vapor line 23. The vapor line 23 can have a flame trap or flame arrestor, not shown, therein.

The liquid hydrocarbon sealant from the separatory drum 20 is discharged through a bottom liquid line 22 which connects to an additional line, including a recycle line segment 15, and a liquid discharge segment 29. A control valve 16 for the recycle in the recycle segment 15, and a control valve 30 in the liquid discharge segment line 29 allows for discharge or return to the vacuum pump means 11, as desired, of all, none, or a portion of the liquid phase separated in the separatory drum 20.

In addition to transfer of liquid from the discharging tank 41 to the receiving vessel 47, the vacuum developed by the pump means 11 may be desired in connection with discharge or emptying of liquid from the receiving tank 47 to a subsequent operation. A liquid line 32 is provided for such purposes, connecting to a dip line 40 in the receiving tank. A valve 36 in the liquid line 32 provides for closure as desired. A liquid meter 38 is customarily provided in the liquid line 32 for metering liquid which is discharged from the tank 47 to a line 39 leading to subsequent processing.

Frequently, in discharging liquid from the tank 47, through the liquid line 32, the meter 38 and the liquid delivery line 39, in succession, a continual vacuum must be applied downstream from the meter 38. This is required to supplement a principal liquid transfer means, not shown, such as an eductor, which is employed to act directly on the liquid flow. In the present apparatus, vacuum is thus applied, when necessary, by a barometric leg line 33 which connects from liquid line 32 (downstream from the meter 38) to the main vacuum line 17 from the pump means 11. A valve 28 is supplied to permit close-off of the barometric leg line 33 when necessary. A barometric leg portion 34 therein has sufficient vertical elevation to make it impossible to aspirate liquid from the liquid line 32 into the main vacuum line 17. An expanded section 35, in the barometric leg line is provided to provide a relatively large volume for any liquid partly inducted into the barometric leg line 33, as well as to provide a substantial disengaging surface for any dissolved gas or vapor which is removed from the liquid under the influence of vacuum applied in the barometric leg line 33.

From the preceding description of the apparatus illustrated by the figure, it will be readily seen that vacuum developed by the pump means 11 can be applied to the receiving vessel 47, to cause transfer of liquid from the discharging tank 41 to the receiving vessel 47, or, alternatively or in concurrence, vacuum can be applied to cause flow of liquid from the receiving vessel 47 through the liquid line 32, the meter 38 and into a liquid discharge line 39 leading to subsequent operation.

Thus, when a vacuum developed is to be employed to cause transfer of liquid from vessel 41 to vessel 47 only, the valve 28, in the branch vacuum line $17_2$ is closed, as well as the valve 36 in the liquid line 32 from the receiving tank 47. The valve 31, in the branch vacuum line 17₁, as well as valve 18, are open. In addition, the valve 46 in the liquid transfer line 44 from the discharging vessel 41 to the receiving vessel 47, and the air intake valve 43 in the air make-up line 42 to the discharging tank 41, are open. The valve 37ₐ, in the branch line 37, is closed. Accordingly, generation of sufficient vacuum by the vacuum pump means 11 causes partial evacuation of vapor or gas in the receiving tank 47. Upon attainment of adequate vacuum therein, liquid passes from the discharging tank 41 to the receiving tank 47.

When liquid is to be transferred or discharged from the receiving vessel 47 to subsequent operations, the settings of the valves are reversed, i.e. the valve 31 in the vacuum branch line 17₁ is closed, as well as the valve 46 in the liquid transfer line 44. The valve 36 in the liquid line 32 from the receiving vessel 47, and valve 28 are opened. This permits application of vacuum through the barometric leg during flow of liquid through the line 32.

*Example I*

The following example illustrates a typical application of the present invention to the transfer of a tetraethyllead antiknock compound liquid from a tank car to a receiving vessel. In this instance, the composition of liquid, in weight percent, provided in the discharging tank 41 was as follows:

Tetraethyllead—60+
Halogenated hydrocarbons—37
Other—about 2

The pump means 11 employed in this operation was a "Nash" type pump having an elliptical casing and a rotating impeller therein, a liquid sealant being circulated around the periphery of the elliptical casing and establishing vacuum by movement to and from the rotary impeller. The sealant liquid in this instance was provided as a relatively small batch of gasoline stock having a Reid vapor pressure of 8.5 pounds initially. Upon starting operation, the sealant liquid had a temperature of 80° F. Initial operation of the Nash pump 11 resulted in the development of a vacuum of 20 inches of mercury, which was applied through the main vacuum line 17 and the branch line 17₁ to the interior of the receiving tank 47. Flow of the antiknock compound liquid immediately started through the liquid transfer line 44, as soon as the vacuum therein was sufficient to overcome the static head and friction flow in the dip line 45 and the transfer line 44.

It was discovered that the sealant gasoline for the vacuum pump 11 fairly rapidly realized a significant drop in temperature of about 4° F. The discharge from the vacuum pump means 11, through line 19, consisted of atmosphere evacuated from the receiving tank 47 and the sealant liquid gasoline. This mixed phase stream passed to the disengaging or knock-out drum 20, the gaseous phase being discharged through the vent line 23. The liquid phase was withdrawn through the bottom line 22 and returned to the pump means 11 through the recycle line 15, the valve 16 being opened. In this instance, the line 14 was closed off by valve 13, as well as the liquid discharge line 29, by closed valve 30. The operation of the vacuum generating apparatus was continued for a period of several hours, during which a significant increase occurred in the vacuum provided by the vacuum pump 11. It was also found that the composition and properties of the sealant gasoline were improved. The Reid vapor pressure, after approximately 2 and ½ hours of operation was reduced to 5.6 pounds per square inch. The vacuum which could be generated under those circumstances was increased to 22.5 inches of mercury. A significant quantity of high volatility components were thus stripped from the sealant gasoline.

As heretofore mentioned a significant and surprising benefit of the present operation is the high degree of removal of physiologically undesirable organometallic components from the vapor or gas aspirated by the vacuum pump means, said component being absorbed in the gasoline. It is surprising that this absorption occurred concurrently with the fractionation or stripping which is encountered and taken advantage of in the generation of the vacuum. Sampling of the vapor removed from the receiving tank 47, during the application of vacuum thereto, showed a concentration of organic lead equal to 122 milligrams lead per standard cubic foot. In contrast, sampling of the vapor discharged from the vacuum generating system, sampled from the vapor discharge line 23, showed a content of only 0.040 milligram lead, showing that a removal efficiency of 99.97 percent was attained and that the vapor discharged through the line 23 was virtually free of objectionable component.

The foregoing example illustrates typical operation employing a relatively high vapor pressure gasoline as a liquid sealant in the operation. As previously indicated, the process is highly operable with quite low vapor pressure hydrocarbon fractions, as is illustrated by the following example.

*Example II*

In this operation, the system was charged with kerosene, introduced to the combined separatory drum-seal tank 20, and this hydrocarbon fraction was employed as a recirculating sealant liquid as in the foregoing example. Upon initiation of operation by operation of the pump 11, and circulation of the kerosene liquid to the pump through lines 15, the valve 16, and line 12, a substantial vacuum was promptly established in the vacuum line 17, and was applied to the receiving tank 47. In extended operation, utilizing the vacuum thus applied, and transferring a tetraethyllead antiknock liquid from the discharging tank 41 to the receiving tank 47, as in the preceding example, it was found that the removal efficiency of organic lead vapor component, from the vapor exhausted from the receiving tank 47, was 99.9 plus percent, said lead component appearing dissolved or absorbed in the kerosene sealant. Hence, again, vapor discharged from the system through vapor line 23 was virtually innocuous, in containing only 0.05 milligram lead, per standard cubic foot of the discharged vapor.

In the foregoing operations the hydrocarbon sealant liquid was employed as a batch system, as indicated. In other words, a continuous supply of hydrocarbon liquid through the initial sealant feed line 14 was *not* provided, but instead a batch was charged and was utilized for a series of successive vacuum establishing operations. The amount of undesirable organometallic liquids absorbed in the sealant liquid is usually quantitatively so low that such a batch can be employed for an extensive period, but is usually discharged after the lead content therein has increased to about 0.10 weight percent, expressed as lead.

As previously mentioned, the vacuum generated by the system can be applied not only for the transfer of liquids, as indicated by the preceding two examples, but can also be employed to remove entrained or dissolved vapor from a flowing stream of liquid as in the following example.

*Example III*

In this operation, the flow of organometallic liquid is from the receiving tank 47, whence it has been introduced by an operation such as already described above, through the discharge line 32, meter 38, and transfer line 39 to a subsequent processing operation. In utilizing vacuum generated by the present operation ancillary to such a transfer, the valve 31 in the branch line 17₁ from the receiving tank 47 is closed, and the valve 36 in the liquid transfer line 32 is opened. The valve 46 in the line 44, permitting transfer of liquid from the discharging tank 41, is closed. The valve 28 in the branch vacuum line 17₂ to the liquid transfer system is opened, hence on generating vacuum in the vacuum pump means 11, it is applied through the barometric loop, valve 28, and line 17₂ to the liquid being transferred through the meter 38.

In carrying out transfer of liquid from the receiving tank 47 following the path above outlined, and applying vacuum to the transfer conduit system downstream from the meter as described above, a certain amount of entrained vapor and vaporized components are passed through the vapor line system outlined, to the vacuum pump means 11, and are discharged as previously described through the vent line 23 to the atmosphere.

In the foregoing operation, the vapor discharged to the atmosphere is virtually free of any lead organometallic component, as in the preceding examples. A high efficiency of operation is attained when either a low volatility or a high volatility hydrocarbon is used as the sealant.

In most cases of operation of any particular installation a batch of sealant liquid is provided in the system and is used for a relatively extensive period. By this is meant that a batch of 50 gallons, say, in a particular equipment installation, can be employed for successive liquid transfer operations without impairment particularly of the vacuum generating and organometallic lead removal function of the operation. This arises from the fact that, although very minute concentrations of vaporized organometallic lead compounds in the atmosphere are highly undesirable physiologically, nevertheless, these constituents, upon absorption under the present process, develop such low partial pressure, even after a plurality of cycles, that their vapor concentration in the vented gas is extremely and adequately low. In other words, the relative quantity of the organometallic lead component absorbed in any explicit single cyclic operation is low relative to the capacity of the quantity of sealant liquid normally provided in a batch or type operation. Illustratively, a batch of gasoline of 50 gallons can be successfully employed for at least 10 cycles of vacuum generating operation, in which, typically, tetraethyllead can be absorbed to, for example, a concentration of as high as 0.5 percent by weight of the sealant liquid.

Although the batch retention of a finite quantity of sealant liquid in the system for a series of successive vacuum generating operations is normally the customary technique employed for convenience, a continuous sealant flow type operation is also highly effective. Such an operation is illustrated by the example given below.

*Example IV*

In this operation the identical equipment is again used, and the sealant liquid is a moderate vapor pressure gasoline having a Reid vapor pressure of 10 pounds per square inch. In contrast to the preceding operations, the operation is characterized by the continuous flow of a make-up gasoline sealant, accompanied by the continuous discharge thereof.

Accordingly, during the operation of the vacuum pump 11, a supply of gasoline having a Reid vapor pressure of 10 pounds per square inch is fed through line 14 and valve 13 to the intake sealant line 12 to the vacuum pump 11, at a rate of 0.1 gallon per minute. This flow is supplemented by a recycle of recirculated sealant liquid through the return line 15 and the recycle control valve 16 therein, providing a total rate to the vacuum pump of about 2 gallons per minute.

Vacuum is generated by the operation of the vacuum pump 11, as in preceding examples, and is applied as before to the receiving tank 47. The vacuum thus generated in the receiving tank 47 is utilized to transfer a tetraethyllead containing antiknock liquid from the discharging tank car tank 41 through the line 44, as in preceding examples.

In this operation, the temperature of the sealant gasoline is slightly lowered in passing through the vacuum generating pump 11, and, further as is illustrated hereinafter, a more effective generation of vacuum than can be anticipated is realized. As in preceding examples, the vapor removed from the receiving tank 47 is thoroughly denuded of vaporized tetraethyllead component, with an efficiency of the order of 99.9 percent or above, so that the vapors vented from the vacuum generating system through line 26, or line 23, are virtually free of lead component. The sealant liquid is passed through the vacuum pump as in other operations and is discharged through the line 19 along with vapor from the receiving tank 47, for disengaging in the disengaging drum 20. In flowing out of the disengaging tank 20 through the liquid line 22 therefrom, this is split into two portions, including a portion of 0.1 gallon per minute discharged through line 29 and valve 30, this quantity corresponding to the make-up quantity introduced through line 14. When similar operations are conducted with other hydrocarbon fractions, including gasolines of higher or lower Reid vapor pressures, or kerosene or similar hydrocarbon liquids, comparable results are obtained, except that as lower normal volatility gasolines or hydrocarbon fractions are employed, the temperature change encountered during operation is diminished.

In the foregoing examples, it will be clear that the method of the present invention is highly effective employing a variety of hydrocarbon sealant materials. Further, as previously stated, a surprising feature of preferred embodiments of the present invention is that, when employing gasoline hydrocarbon stocks of relatively high vapor pressure, the vacuum which can be generated is appreciably above any level which can be theoretically predicted. In addition to the fact that an unanticipated vacuum benefit is thus realized, a temperature lowering effect is further obtained, despite the mechanical work done in the system, so that any disadvantages of using a highly volatile hydrocarbon liquid are compensated by this result of the operation.

To illustrate further the above surprising discovery, it is found that when the vapor pressure of a gasoline, employed as a sealant liquid in the vacuum generating pump, is about 7 inches of mercury above, the vacuum which can be established is appreciably greater than the predictable level. This benefit is illustrated below, in which actual obtainable vacuum is tabulated versis the theoretically obtainable vacuum for various gasoline stocks having the tabulated vapor pressures in inches of mercury at 100° F.

| Vapor pressure, inches mercury | Predicted vacuum obtainable, inches mercury | Actual vacuum obtainable, inches mercury |
| --- | --- | --- |
| 9 | 21 | 21.8 |
| 10 | 20 | 21.2 |
| 12 | 17 | 20.4 |
| 14 | 16 | 19.5 |

From the foregoing tabulation, it is clear that when employing relatively high volatility gasolines as the hydrocarbon sealant liquid, an unanticipated benefit of a higher vacuum obtained, of as much as 10 or 15 percent over the predictable vacuum, is realized under the present operation. Further, as illustrated by Example I, when employing high volatility gasolines, particularly those having a volatility equal to or above a vapor pressure of about 7 inches of mercury at 100° F., the circulation of the sealant liquid through the vacuum generating means is accompanied by a drop in temperature thereof. The particular benefits attributed to this mode or embodiment of the invention is that a hazard of mounting temperature of the hydrocarbon is reduced. In addition, when employing a relatively high volatile fraction, as illustrated above, supplemental cooling equipment, when necessary, is substantially simpler than when employing the less volatile hydrocarbon liquids. Further, the employment of gasoline, generally, as a sealant liquid provides an ideal opportunity to employ, as a sealant, a stream which is subsequently to be blended with, or can be blended with, the liquid which is transferred by the operation.

As previously mentioned, a particular benefit of the present invention is the fact that commonly available hydrocarbon stocks, specifically, high volatility gasolines, can be employed to great advantage by the present process. As illustrated above, not only is the vacuum available greater than can be anticipated from the properties of the gasoline, but, in preferred embodiments, the attainable vacuum actually increases during operation. This benefit is of great significance, since, in most liquid transfer situations, the need for vacuum increases during the operation. This change in demand is readily understood by reference to the figure. When transferring liquid from a full tank 41 to an empty receiving tank 47, it is clear that the initial vacuum required is, essentially, only that required to cause flow of liquid from the top level of the charge in the discharging vessel. However, when the discharging tank 41 is nearly empty, and the receiving tank 47 is nearly full, it will be clear that the vacuum (applied through line 17) must balance, or overcome the static head in lifting the liquid from the discharging tank 41, plus the similar static head of the liquid already in the receiving tank. Accordingly, in such a liquid transfer operation, the demand for degree of vacuum substantially increases during an operation.

When employing an initially high volatility gasoline, by a recirculating batch technique, as in Example I, it is found that the maximum vacuum generatable increases with time, so that the increased resistances to flow (or greater vacuum demand) is automatically compensated by the process. Further, the actual vacuum generated at any particular time, is greater than predictable from the proportions of the gasoline. These benefits are illustrated by the following data; which were obtained with a gasoline having an initial Reid vapor pressure of 8.5:

| Time of Operation (Minutes) | Vacuum Generated (In. of Hg) | Theoretical vacuum attainable (In. of Hg) |
|---|---|---|
| 0 | 20 | 12.9 |
| 40 | 20 | 14.9 |
| 60 | 20.6 | 15.9 |
| 120 | 21.8 | 18.4 |
| 140 | 21.8 | 18.9 |
| 160 | 22.5 | 20.7 |

From the foregoing, it is seen that, not only is the vacuum obtained higher than predictable, but, in an operating period of less than 3 hours, an increase of about 12½ percent in vacuum attainable is provided. The benefits of this finding are realized when a fresh batch of sealant liquid is provided for each liquid transfer operation.

It is clear from the preceding description that in all embodiments of the invention a mechanical vacuum generating means, employing a liquid sealant, is employed in the process. Various devices of this character are available and are generally referred to as wet type vacuum pumps. The characteristic of the vacuum pumps employed or involved in the present operation is that the sealant liquid is circulated in appreciable quantity through the working space of the pump, is subjected to the vacuum generated therein, and is discharged along with gases evacuated from whatever space is connected to the intake of the vacuum. A particular form of such wet pumps on the so called "Nash" or "Connersville" pumps, in which a peripheral stream of sealant liquid is circulated in an ovoid casing by rotation of a multi-vaned impeller, the movement of the liquid seal means to and from the center of the radial impeller being responsible for the generation of vacuum and the movement of the vapors through the system.

The rate of liquid flow in the vacuum generating means, during the generation and application of vacuum, is largely a function or characteristic of the particular apparatus employed, and of the movement of gases under the influence of a vacuum. Thus, for a typical Nash pump employing the gasoline, a preferred rate of liquid sealant flow is 2 gallons per minute, for a maximum obtainable vacuum of 24 inches of mercury. This refers to a vacuum realized with no gaseous flow, in other words the vapor intake line being virtually throttled off.

Among other applications to which the present invention is applicable would be the transfer of, for example, a high volatility gasoline from one to another tank or from a storage tank to a subsequent operation for blending or the like. An interesting feature of the present invention is that, owing to the unanticipated actual vacuum generated, a high volatility gasoline itself can be employed very effectively to transfer a substantial supply of such a gasoline. Owing to the fact that sealant liquids of this character are lowered in temperature during the processing or generation of vacuum, this increases the potential quantity or level of vacuum which can be generated, so that the volatility of the stock to be processed, when used as a sealant liquid is not a disadvantage but is actually utilized to good advantage. Accordingly, in such instances, it would not be necessary to employ any foreign or dissimilar sealant liquid. The method of the invention is also fully applicable to generating vacuum, and removing undesirable components from evacuated gases, when said components are other compounds than tetraethyllead. For example, vacuum so induced can be employed in the movement of tetra n-butyl lead, solutions of other lead tetraorgano compounds, aluminum alkyls, and other materials.

Having fully described the present invention and the various modes of operation thereof, what is claimed is:

In the vacuum induced transfer of a batch of an antiknock liquid, having a lead alkyl component, from a discharging vessel initially substantially full to a receiving vessel initially substantially filled with gas, wherein the vacuum required increases during transfer because of changes of liquid level, and the vacuum also causes vaporization of the lead alkyl component from the antiknock compound into the gas being removed from the receiving vessel, said gas to be ultimately vented, the improvement comprising generating vacuum by a mechanical, liquid sealed, vacuum pump, the liquid being a circulated batch of hydrocarbon liquid having initially a vapor pressure of at least about 7 inches of mercury at 100° F., applying the vacuum generated to the receiving vessel and exhausting gas therefrom to induce the flow of antiknock liquid thereto, discharging the sealant liquid and the gas from the vacuum pump, separating and venting the gas, and recirculating the hydrocarbon liquid, the hydrocarbon sealant liquid being circulated until it has absorbed lead alkyl components to a concentration of up to about 0.1 weight percent lead, whereby the gas vented is essentially free of lead alkyl components.

References Cited in the file of this patent

UNITED STATES PATENTS

| 1,686,475 | Southgate | Oct. 2, 1928 |
| 2,098,378 | Dodge | Nov. 9, 1937 |
| 2,280,100 | Singleton | Apr. 21, 1942 |
| 2,856,950 | Zars | Oct. 21, 1958 |
| 2,947,379 | Aubrey | Aug. 2, 1960 |